United States Patent
Mohs et al.

(10) Patent No.: US 7,616,894 B2
(45) Date of Patent: Nov. 10, 2009

(54) SYSTEM AND METHOD FOR MITIGATING DISPERSION SLOPE IN AN OPTICAL COMMUNICATION SYSTEM

(75) Inventors: Georg Heinrich Mohs, East Brunswick, NJ (US); Jin-Xing Cai, Morganville, NJ (US); Morten Nissov, Ocean, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 580 days.

(21) Appl. No.: 11/024,235

(22) Filed: Dec. 28, 2004

(65) Prior Publication Data

US 2006/0140632 A1   Jun. 29, 2006

(51) Int. Cl.
*H04J 14/00* (2006.01)
*H04J 14/02* (2006.01)

(52) U.S. Cl. .................. 398/81; 398/75; 398/85; 398/98

(58) Field of Classification Search .......... 398/47, 398/75, 98, 202–214, 85, 79, 81, 84, 87
See application file for complete search history.

(56) References Cited

U.S. PATENT DOCUMENTS

| 5,786,918 | A  | 7/1998  | Suzuki et al. |
| 5,923,683 | A  | 7/1999  | Morioka et al. |
| 6,411,416 | B1 | 6/2002  | Ooi et al. |
| 6,459,516 | B1 | 10/2002 | Mizrahi et al. |
| 6,654,516 | B2 | 11/2003 | So |
| 2002/0001114 | A1* | 1/2002 | Farries ............ 359/123 |
| 2002/0048069 | A1* | 4/2002 | Ibukuro ............ 359/154 |
| 2004/0028415 | A1 | 2/2004 | Eiselt |
| 2004/0208617 | A1* | 10/2004 | Essiambre et al. ....... 398/158 |

OTHER PUBLICATIONS

International Search Report and Written Opinion mailed on Apr. 26, 2007 in connection with corresponding PCT Patent Application No. PCT/US05/47031.
Supplemental European Search Report mailed on Nov. 30, 2007 in connection with corresponding European Application No. 05855566.5.
European Office Action issued in related European Patent Application No. 05855566.5 dated Feb. 6, 2008 (8 pages).
European Office Action dated Sep. 9, 2008 issued in related European Patent Application No. 05855566.5.

* cited by examiner

*Primary Examiner*—M. R. Sedighian
(74) *Attorney, Agent, or Firm*—Grossman, Tucker, Perreault & Pfleger, PLLC

(57) ABSTRACT

A system and method for mitigating dispersion slope is capable of reducing the performance impact on an optical communication system caused by dispersion slope. The system and method receives an optical signal, demultiplexes the optical signal and optically filters the demultiplexed optical signals. The optical filters may have a bandwidth that is wide with respect to the demultiplexed optical signals and narrow with respect to the original optical signal.

5 Claims, 5 Drawing Sheets

SYSTEM AND METHOD FOR MITIGATING DISPERSION SLOPE IN AN OPTICAL COMMUNICATION SYSTEM

TECHNICAL FIELD

The present invention generally relates to optical communications, and more specifically, relates to mitigating dispersion slope in an optical communication system by demultiplexing and filtering in series.

BACKGROUND

The capacity of long-haul optical communications systems, such as "undersea" or "submarine" systems, has been increasing. In order to maximize the transmission capacity of an optical communications system, a single optical fiber may carry multiple optical channels (e.g., 64 or more signals) using a process known as wavelength division multiplexing (WDM). Another technique to increase system capacity is time division multiplexing (TDM) where the data rate of the optical channel is increased (e.g. to 40 gigabits per second (Gb/s)). Time division multiplexing may be used to reduce system costs since fewer optical components are necessary for the same capacity.

When data rates are increased, however, the performance of an optical channel may be limited by optical effects such as chromatic dispersion or dispersion slope. When light propagating within an optical fiber accumulates chromatic dispersion, the light is delayed within the optical fiber according to frequency or wavelength. The delay causes spreading of the light pulses, which may result in bit errors in the received signal. The specific amount of accumulated dispersion varies depending upon the wavelength of the light. The extent to which dispersion varies as a function of light wavelength is often referred to as dispersion slope. Various dispersion management techniques have been used to reduce dispersion and to manage dispersion slope.

In current high bit rate systems with a per-channel data rate of, for example, 40 Gb/s, the 40 Gb/s signal can suffer significantly from dispersion slope due to its large spectral bandwidth. In general, as the bit rate increases, the bit period decreases and the signal spectral bandwidth increases, making dispersion slope compensation more of a concern. Even though the dispersion may vanish at the signal carrier frequency as a result of existing dispersion management techniques, the spectral components away from the signal carrier frequency may reach the decision circuit in the receiver at different times because of dispersion slope.

Current system designs therefore may use a mix of TDM and WDM techniques to optimize cost and performance. Any advancement in the field that allows going to higher data rates per channel has the potential to lower system cost. Accordingly, what is needed is a system and method capable of reducing the negative performance impact caused by dispersion slope, especially in high data rate channels.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
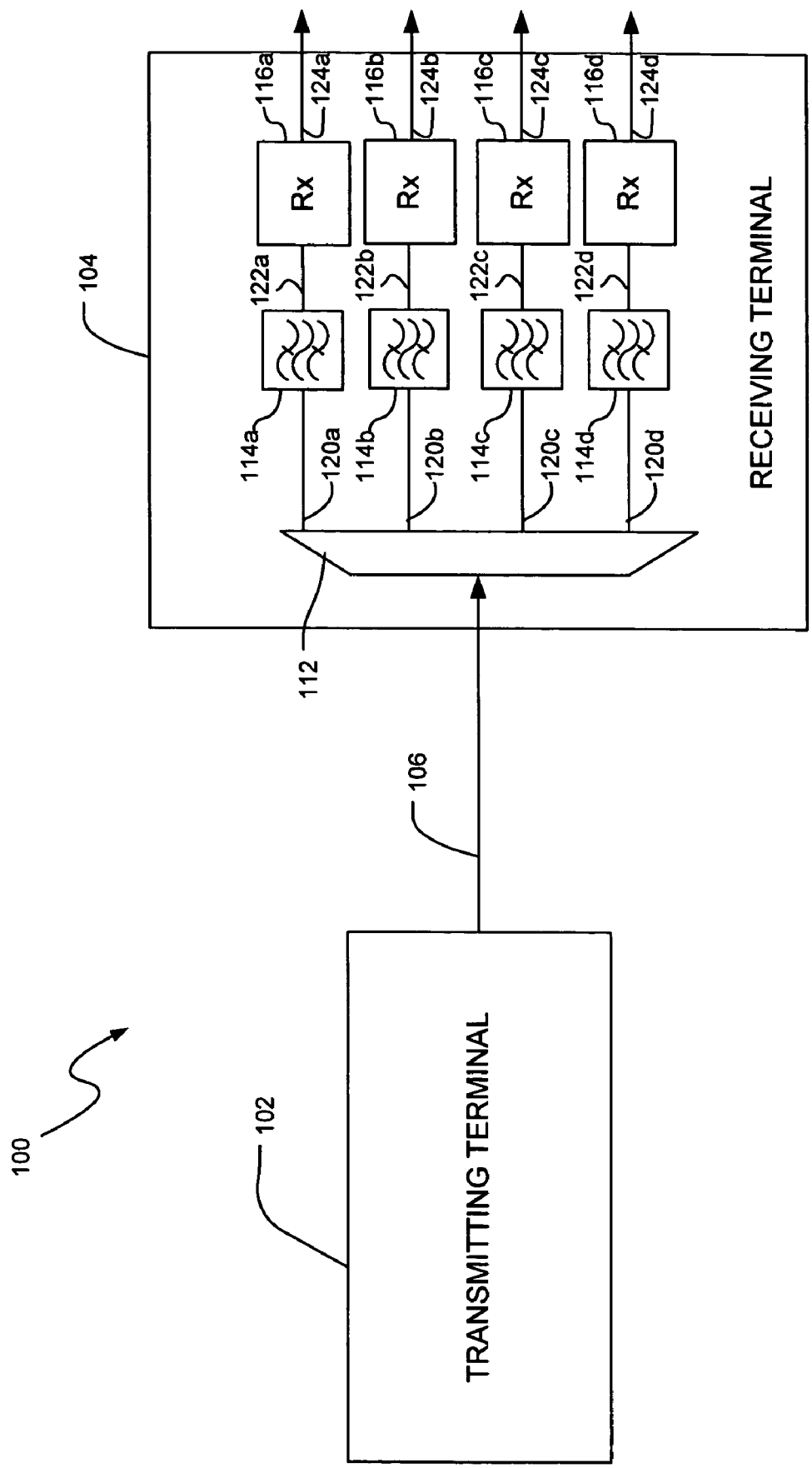
FIG. 1 is a block diagram of one embodiment of an optical communication system capable of providing dispersion slope mitigation, consistent with the present invention.

FIG. 1 illustrates an optical communication system 100 capable of providing dispersion slope mitigation, consistent with one embodiment of the present invention. The communication system 100 operates to transmit an optical signal 106 from a transmitting terminal 102 to a receiving terminal 104. In general, the system and method for mitigating dispersion slope is capable of reducing the performance impact caused by dispersion slope by demultiplexing and then optical filtering the optical signal 106 in the receiving terminal 104.

Those skilled in the art will recognize that the system 100 has been depicted as a highly simplified point-to-point system for ease of explanation. For example, the transmitting terminal 102 and receiving terminal 104 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the invention may be incorporated into a wide variety of network components and configurations. The illustrated exemplary embodiments herein are provided only by way of explanation, not of limitation.

The system and method for mitigating dispersion slope may be implemented in optical communication systems known to those skilled in the art, including, but not limited to, long-haul WDM and DWDM systems as well as single channel and short haul systems. The system and method is particularly advantageous in an optical communications system 100 capable of high data rates per channel, for example, where the optical signal 106 is a 40 Gb/s signal. Those skilled in the art will recognize, however, that the system and method described herein may be implemented in communication systems having other data rates. The received optical signal 106 may be a multiplexed signal or may be a high bandwidth clear channel. The system and method for mitigating dispersion slope may be effective in any system in which an optical signal has spectral components that may be affected by dispersion slope.

In the illustrated embodiment, the receiving terminal 104 includes an optical time division demultiplexer 112, optical filters 114a-114d, and receivers 116a-116d. The receiving terminal 104 is shown in highly simplified form for ease of explanation. Those skilled in the art will recognize that the receiving terminal 104 may include other electrical and/or optical components for receiving and processing optical signals.

The receiving terminal 104 receives the optical signal 106 having a data rate of, for example, 40 Gigabits per second (Gb/s). The optical demultiplexer 112 demultiplexes the optical signal 106 into demultiplexed component optical signals 120a-120d each having data rates of, for example, 10 Gb/s. Each of the optical filters 114a-114d optically filters the respective demultiplexed optical signals 120a-120d. The optical receivers 116a-116d receive and process the respective demultiplexed-filtered optical signals 122a-122d to produce output data signals 124a-124d. The optical demultiplexer 112 may be any suitable optical time division demultiplexer known to those skilled in the art. Although the exemplary embodiment demultiplexes a 40 Gb/s optical signal into four (4) demultiplexed 10 Gb/s optical signals, those skilled in the art will recognize that other data rates and demultiplexing ratios are possible and that this is not a limitation of the system and method described herein.

In the exemplary embodiment, the optical signal 106 represents a single optical wavelength channel. For ease of explanation, the optical communication system 100 is shown as transmitting and receiving only the optical signal 106. The optical signal 106 may be further wavelength division multiplexed with other optical signals at other wavelengths using other techniques known to those skilled in the art such as WDM or dense WDM techniques. In such a case, the optical communication system 100 may transmit and receive multiple optical signals 106 and the receiving terminal 104 may include additional components for mitigating dispersion slope in each of the optical signals 106.

Each of the optical filters 114a-114d may have a bandwidth that is wide with respect to the spectral width or bandwidth of the individual demultiplexed optical signals 120a-120d and narrow with respect to the spectral width or bandwidth of the original optical signal 106. As used herein, "wide" means that the bandwidth of the filter is greater than the bandwidth of the signal and "narrow" means that the bandwidth of the filter is less than the bandwidth of the signal. As used herein, "bandwidth" refers to both the width of the frequency band allowed to pass through the optical filter (e.g., in GHz) and twice the clock frequency of the signal (e.g., also in GHz). Using a filter with these characteristics, the received optical signal 106 is narrowband filtered to mitigate the performance impact of dispersion slope but the demultiplexed optical signals 120a-120d are wideband filtered to avoid the performance impact from narrowband optical filtering. As used herein, "narrowband filtering" refers to the narrow bandwidth of the optical filters 114a-114d with respect to the bandwidth of the received optical signal 106 and "wideband filtering" refers to the wide bandwidth of the optical filters 114a-114d with respect to the bandwidth of the demultiplexed signals 120a-120d. To provide the wideband filtering and narrowband filtering, the bandwidth of each of the optical filters 114a-114d may be less than twice the clock frequency of the original optical signal 106 and greater than twice the clock frequency of the demultiplexed component optical signals 120a-120d.

In the exemplary embodiment, narrowband filtering may be accomplished when the ratio of the bandwidth of the optical filters 114a-114d to the bandwidth of the received optical signal 106 is less than or equal to 1 and wideband filtering may be accomplished when the ratio of the bandwidth of the optical filters 114a-114d to the bandwidth of the demultiplexed signals 120a-120d is greater than or equal to 1. In a system where a 40 Gb/s signal is demultiplexed into 10 Gb/s signals, for example, the optical filters 114a-114d may have a bandwidth in a range of about 20 to 80 GHz. In the presence of a high performance penalty due to dispersion slope, best performance may be achieved if the filters 114a-114d are as narrow as possible without narrowband filtering the demultiplexed signals 120a-120d and more specifically when the ratio of the bandwidth of the optical filters 114a-114d to the bandwidth of the demultiplexed signals 120a-120d is equal to 1 (or about 20 GHz in this example). One example of an optical filter that may be used is an optical bandpass filter capable of providing single side band filtering, such as a grating filter. Those skilled in the art will recognize that any optical filter having the desired bandwidth characteristics may be used.

The receivers 116a-116d process the demultiplexed-filtered signals 122a-122d in a manner known to those skilled in the art, for example, by converting the optical signal to an electrical signal and detecting a bit stream. Those skilled in the art will recognize that each of the receivers 116a-116d may include electrical and optical components configured for processing the optical signals, such as opto-electrical converters, decision circuits, and the like.

Figure 2:
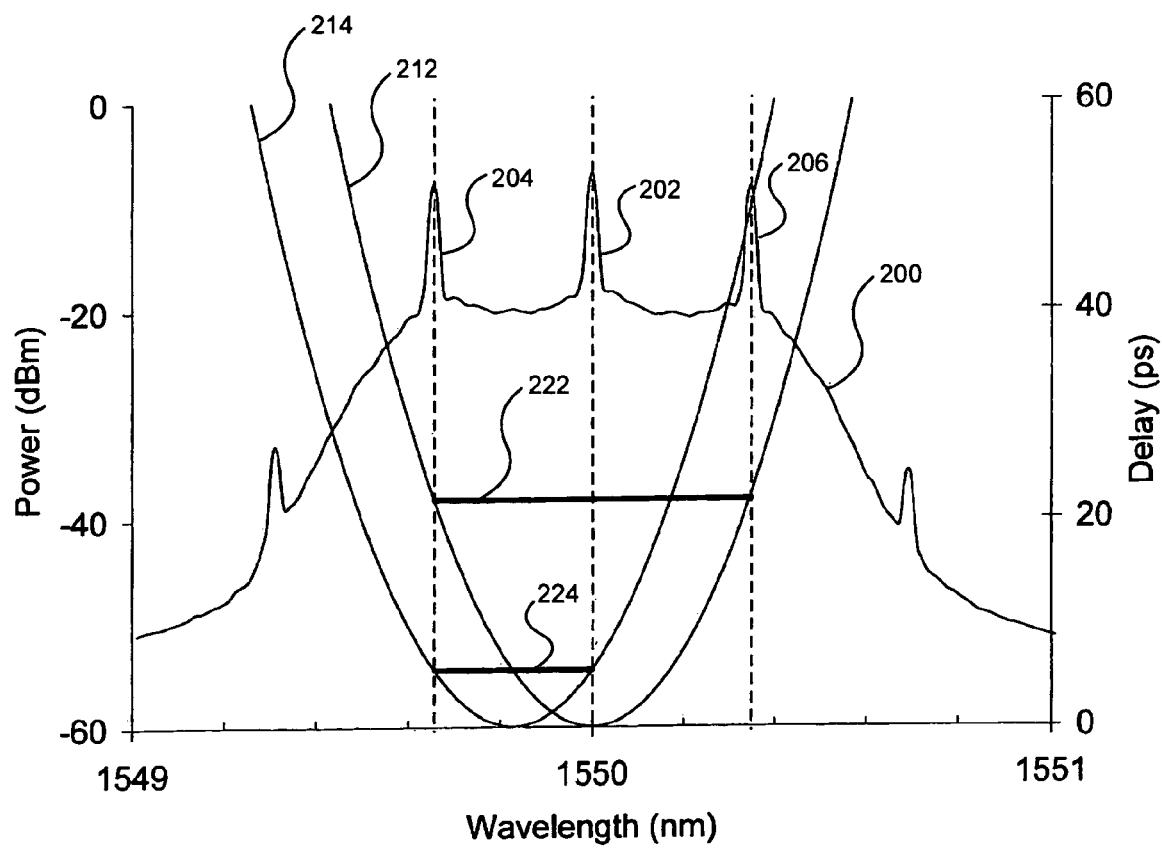
FIG. 2 is a graph of an optical spectrum of a high bit rate signal illustrating group delay due to dispersion slope.
Figure 3:
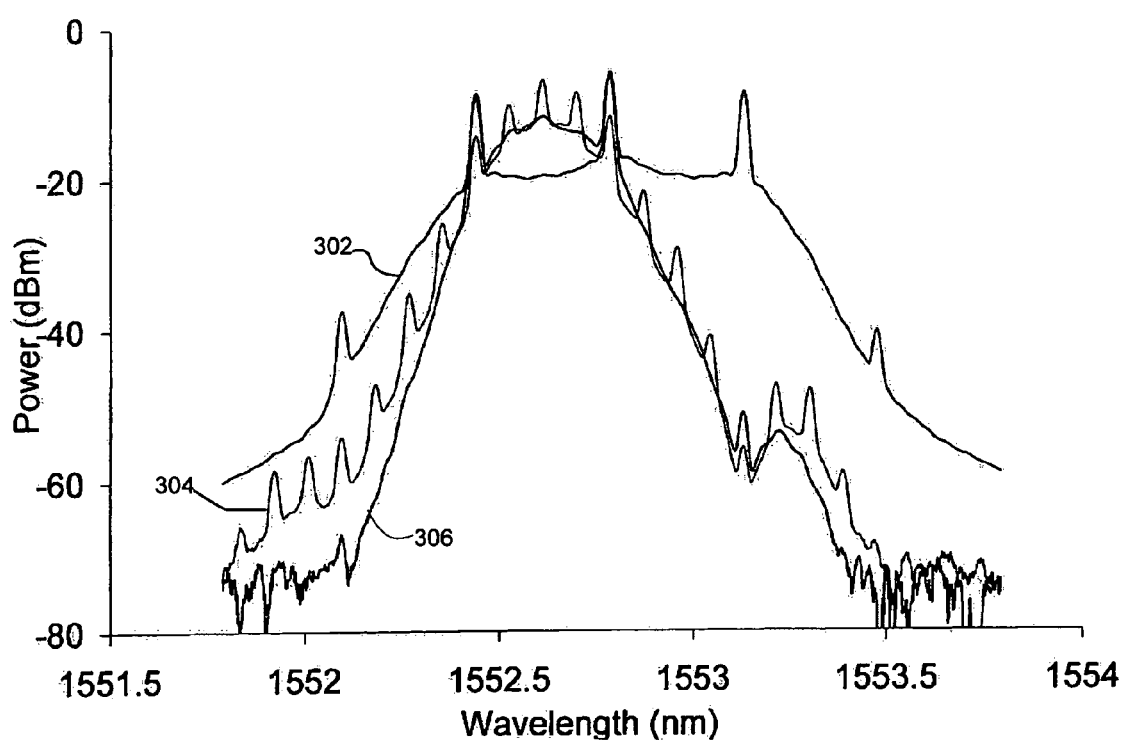
FIG. 3 is a graph of optical spectrums of a high bit rate signal and corresponding demultiplexed and filtered signals illustrating the effect of optical filtering after demultiplexing, consistent with one embodiment of the present invention.
Figure 4:
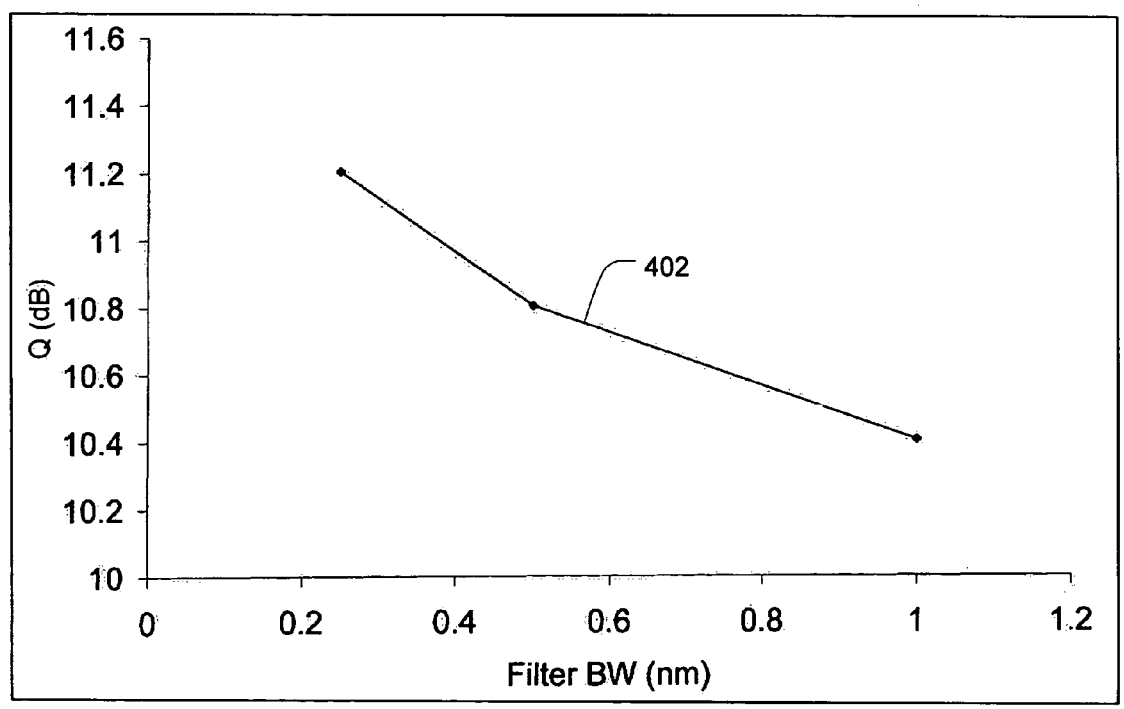
FIG. 4 is a graph illustrating system performance as a function of optical filter bandwidth for one example of an optical signal propagated a distance of 4100 kilometers on a conventional fiber test bed.

FIGS. 2-4 illustrate how filtering of the demultiplexed optical signals 120a-120d advantageously reduces the impact of dispersion slope on performance. FIG. 2 is a graph of a 40 Gb/s optical spectrum 200 having a carrier 202 and spectral components or sidebands 204, 206 arising from pulse modulation. The lines 212, 214 indicate group delay due to dispersion slope. If the 40 Gb/s signal is wideband filtered (e.g., at a bandwidth of about 80 GHz), the group delay is indicated by line 212 and the resulting delay between the wings 204, 206 and the carrier 202 is about 20 ps, as indicated by the horizontal line 222. If the 40 Gb/s signal is narrowband filtered (e.g., at a bandwidth of about 40 GHz), the group delay is indicated by line 214 and the resulting delay is about 5 ps, as indicated by the horizontal line 224. Thus, narrowband filtering of the 40 Gb/s signal to reduce the spectral bandwidth by half may eliminate spectral components with large delay, thereby reducing residual delay by a factor of about four. Although narrowband filtering of the original optical signal 106 (i.e., the 40 Gb/s) may eliminate spectral components with large delay caused by dispersion slope, such narrowband filtering may result in performance penalties through intersymbol interference.

Optical filtering following demultiplexing enables the use of a filter bandwidth that is wide with respect to the bandwidth of the demultiplexed signals (avoiding filter penalties), yet narrow with respect to the bandwidth of the original signal (reducing the impact of dispersion slope on performance). FIG. 3 is a graph of optical spectrums 302, 304, 306 corresponding to the original optical signal and the demultiplexed and filtered signals, thereby illustrating the results of optical filtering. The optical spectrum 302 represents a 40 Gb/s optical signal. The optical spectrum 304 represents a corresponding component optical signal that has been demultiplexed and filtered in series, as described above. The optical spectrum 306 represents narrowband filtering of the 40 Gb/s optical signal without demultiplexing.

FIG. 4 is a graph illustrating system performance as a function of optical filter bandwidth for one example of an optical signal propagated a distance of 4100 kilometers on a re-circulating loop test bed using non-zero dispersion-shifted fiber. In this example, the optical signal has a bit rate of about 42.6 Gb/s and the dispersion slope is about 316 ps/nm$^2$. As shown by the plot 402, narrowband filtering provides superior performance. In this example, an optical filter bandwidth of about 0.25 nanometers (nm) may result in a Q-factor of about 11.2 dB, while an optical filter bandwidth of about 1.0 nm may result in a Q-factor of about 10.4 dB.

Figure 5:
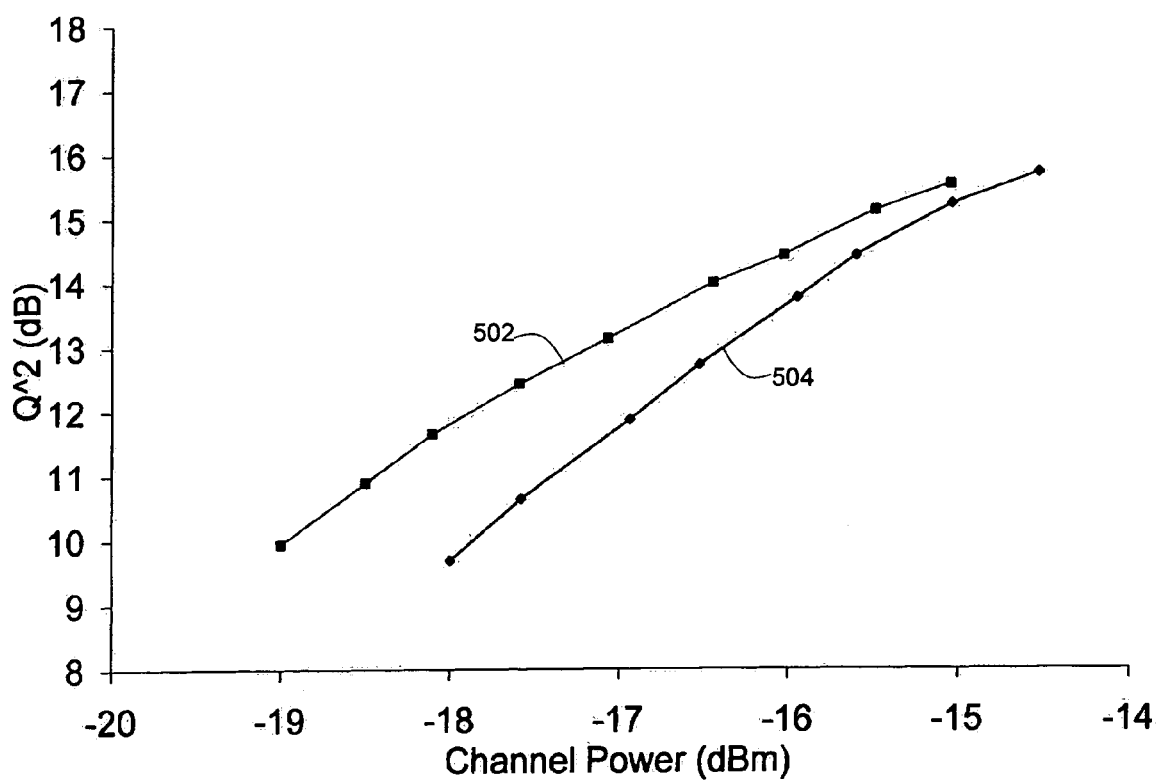
FIG. 5 is a graph illustrating system performance as a function of channel power in a back-to-back configuration for a demultiplexed-filtered signal as compared to a filtered-demultiplexed signal.

FIG. 5 is a graph illustrating the advantage of demultiplexing the original optical signal prior to optical filtering of the component optical signals. The plot 502 represents the performance as a function of channel power in a back-to-back configuration when demultiplexing a 40 Gb/s optical signal to four 10 Gb/s optical component signals which are then wideband filtered. The plot 504 represents the performance as a function of channel power in a back-to-back configuration when narrowband filtering a 40 Gb/s optical signal and then demultiplexing to four 10 Gb/s optical component signals. The optical filter bandwidth used for each of the plots 502, 504 is about 30 GHz. As shown, at a channel power of about −18 dBm, the Q-factor is about 10 dB for narrowband filtering with respect to the 40 Gb/s signal (plot 504) and about 12 dB when going to wideband filtering with respect to the demultiplexed signal (plot 502) demonstrating the performance impact of narrowband filtering.

In summary, an apparatus consistent with one embodiment of the present invention includes at least one optical time division demultiplexer capable of demultiplexing an optical signal into demultiplexed component optical signals and at least one optical filter capable of optically filtering one of the component optical signals. The optical filter has a bandwidth that is wide with respect to a bandwidth of the component optical signals and narrow with respect to a bandwidth of the original optical signal.

According to another embodiment, a receiver terminal includes at least one optical time division demultiplexer capable of demultiplexing an optical signal into demultiplexed component optical signals and a plurality of optical filters capable of optically filtering one of the component optical signals. Each optical filter has a bandwidth that is wide with respect to a bandwidth of the component optical signals and narrow with respect to a bandwidth of the original optical signal. The receiving terminal also includes a plurality of receivers configured to process the filtered component optical signals to produce a data stream.

According to a method consistent with one embodiment of the present invention, an optical signal is received, the optical signal is time division demultiplexed into component optical signals, and the component optical signals are filtered using a filter bandwidth that is wide with respect to the bandwidth of the component optical signals and narrow with respect to the bandwidth of the received optical signal.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of receiving an optical signal, said method comprising:
   receiving an optical signal;
   time division demultiplexing the optical signal into component optical signals using a time division demultiplexer; and
   mitigating chromatic dispersion slope in said optical signal by:
   determining a filter bandwidth in response to a clock frequency of the received optical signal and a clock frequency of the demultiplexed component optical signals, said filter bandwidth being greater than twice the clock frequency of the demultiplexed component optical signals and less than twice the clock frequency of the received optical signal; and
   filtering the component optical signals in an optical filter using said filter bandwidth.

2. The method of claim 1, further comprising processing the demultiplexed filtered component optical signals to produce data streams.

3. The method of claim 1, wherein the received optical signal has a bandwidth of about 40 Gigabits per second, and wherein each of said component optical signals has a bandwidth of about 10 Gigabits per second.

4. The method of claim 1, wherein said optical filter has a bandwidth in the range of about 20 to 80 GHz.

5. The method of claim 1, wherein said optical filters has a bandwidth of about 20 GHz.

* * * * *